United States Patent
Holland et al.

(10) Patent No.: US 7,191,357 B2
(45) Date of Patent: Mar. 13, 2007

(54) HYBRID QUORUM/PRIMARY-BACKUP FAULT-TOLERANCE MODEL

(75) Inventors: Mark C. Holland, Pittsburgh, PA (US); James D. Zelenka, Pittsburgh, PA (US); Garth A. Gibson, Pittsburgh, PA (US)

(73) Assignee: Panasas, Inc., Pittsburgh, PA (US)

( * ) Notice: Subject to any disclaimer, the term of this patent is extended or adjusted under 35 U.S.C. 154(b) by 569 days.

(21) Appl. No.: 10/324,276

(22) Filed: Dec. 19, 2002

(65) Prior Publication Data

US 2004/0078654 A1 Apr. 22, 2004

Related U.S. Application Data

(60) Provisional application No. 60/368,796, filed on Mar. 29, 2002, provisional application No. 60/372,039, filed on Apr. 12, 2002.

(51) Int. Cl.
*G06F 11/00* (2006.01)
(52) U.S. Cl. ............ 714/5; 714/4; 714/42; 714/6; 709/205; 718/105
(58) Field of Classification Search ............ 714/4, 714/5, 42, 6; 709/205; 718/105
See application file for complete search history.

(56) References Cited

U.S. PATENT DOCUMENTS

| | | | |
|---|---|---|---|
| 5,845,082 A | 12/1998 | Murakami | |
| 5,946,686 A | 8/1999 | Schmuck et al. | 707/10 |
| 5,948,109 A * | 9/1999 | Moiin et al. | 714/4 |
| 5,956,734 A | 9/1999 | Schmuck et al. | 707/205 |
| 5,960,446 A | 9/1999 | Schmuck et al. | 707/205 |
| 5,987,477 A | 11/1999 | Schmuck et al. | 707/201 |

(Continued)

FOREIGN PATENT DOCUMENTS

EP  001107119 A2 *  6/2001

OTHER PUBLICATIONS

Fu, Ada Waichee, Delay-Optimal Quorum Consensus for Distributed Systems, IEEE Transactions on Parallel and Distributed Systems, vol. 8, No. 1, Jan. 1997.*

(Continued)

*Primary Examiner*—Robert Beausoliel
*Assistant Examiner*—Christopher McCarthy
(74) *Attorney, Agent, or Firm*—Morgan Lewis & Bockius LLP (57) ABSTRACT

A hybrid quorum/consensus and primary-backup fault-tolerance model in an object-based distributed data storage system. When a primary manager fails, a hierarchy of network entities is established in which a group of realm managers first authorizes a failure-handling event through quorum/consensus and a backup manager (for the failing primary manager) then executes the decision of the quorum of realm managers. The realm managers, operating by consensus, determine whether (a) the primary manager can indeed be asserted to be down, and (b) whether there is a quorum of realm managers in agreement on this decision. If both are true, a master realm manager instructs the backup manager to proceed to execute the necessary steps to become the primary manager and function as the primary until the original primary manager is brought back into service. The hybrid fault-tolerance approach handles both single unit failures and network partitions in a unified way, without creating a single cluster out of the fault domain.

23 Claims, 3 Drawing Sheets

U.S. PATENT DOCUMENTS

| | | | |
|---|---|---|---|
| 6,023,706 A | 2/2000 | Schmuck et al. | 707/200 |
| 6,233,623 B1 | 5/2001 | Jeffords et al. | 709/316 |
| 6,292,905 B1 | 9/2001 | Wallach et al. | 714/4 |
| 6,675,199 B1* | 1/2004 | Mohammed et al. | 709/208 |
| 2003/0023680 A1* | 1/2003 | Shirriff | 709/204 |
| 2006/0036896 A1* | 2/2006 | Gamache et al. | 714/4 |
| 2006/0090095 A1* | 4/2006 | Massa et al. | 714/4 |

OTHER PUBLICATIONS

Article by Leslie Lamport entitled "The Part-Time Parliament," pp. i-vi, 1-42, Digital Equipment Corporation, Sep. 1, 1989.

Article by Garth A. Gibson et al. entitled "A Cost-Effective, High-Bandwidth Storage Architecture," pp. 92-103, Association for Computing Machinery, 1998.

Article by Andreas Dilger & Peter J. Braam entitled "Object Based Storage HOWTO," pp. 1-13, v. 1.2, Dec. 23, 1999, available at http://www.lustre.org/docs.

Article by Garth A. Gibson and Rodney Van Meter entitled "Network Attached Storage Architecture," pp. 37-45, Communications of the ACM, Nov. 2000, vol. 43, No. 11.

* cited by examiner

HYBRID QUORUM/PRIMARY-BACKUP FAULT-TOLERANCE MODEL

REFERENCE TO RELATED APPLICATIONS

This application claims priority benefits of prior filed now abandoned U.S. provisional patent applications Ser. No. 60/368,796, filed on Mar. 29, 2002 and Ser. No. 60/372,039, filed on Apr. 12, 2002, the disclosures of both of which are incorporated herein by reference in their entireties.

BACKGROUND

1. Field of the Invention

The present invention generally relates to data storage systems and methods, and, more particularly, to a methodology for providing fault tolerance in a distributed object based data storage network using a hierarchy of network entities for fail-over decision making and execution.

2. Description of Related Art

With increasing reliance on electronic means of data communication, different models to efficiently and economically store a large amount of data have been proposed. A data storage mechanism requires not only a sufficient amount of physical disk space to store data, but various levels of fault tolerance or redundancy (depending on how critical the data is) to preserve data integrity in the event of one or more disk failures. The availability of fault-tolerance is almost mandatory in modern high-end data storage systems. One group of schemes for fault tolerant data storage includes the well-known RAID (Redundant Array of Independent Disks) levels or configurations. A number of RAID levels (e.g., RAID-0, RAID-1, RAID-3, RAID-4, RAID-5, etc.) are designed to provide fault tolerance and redundancy for different data storage applications. A data file in a RAID environment may be stored in any one of the RAID configurations depending on how critical the content of the data file is vis-á-vis how much physical disk space is affordable to provide redundancy or backup in the event of a disk failure.

Another method of fault tolerance in existing distributed data storage systems is the use of partitioning to divide the storage network into a number of "fault domains." A fault domain is a set of network entities (e.g., storage servers, storage disks, client machines, etc.) that can be affected by a failure or involved in a recovery from the failure. In a partitioned network, a set of storage disks residing in a partition are assigned to a particular server and only that server is involved in later fault recovery when one of its assigned disks fails. Because of the rigid partitioning, a server "owns" certain devices (e.g., storage disks) and makes the sole decision as to how to handle device failures within the devices in the partition. Even when the server has a backup for failure handling, the server and its backup still make all the decisions as to how to handle fail-over between that server and other servers in other partitions in the network.

In a distributed data storage system, fault domains may be very fluid because of the distributed nature of the storage system. If load balancing is employed in such a storage system across all system components, then a fault domain may end up including the entire system. However, due to network latency and communication overhead, it may not be feasible to have every network entity or system component form a single cluster. It is therefore desirable to provide fault tolerance at all levels in such a distributed data storage system without rigidly partitioning the system into fault domains. It is further desirable to handle both single unit failures and network partitions in a unified way so as to maintain an integrated storage environment, without creating a single cluster out of the storage domain.

SUMMARY

In one embodiment, the present invention contemplates a method of handling a client's inability to obtain service from a primary manager in an object-based data storage system. The method comprises configuring the client to issue a request for the service to a backup manager associated with the primary manager; configuring the backup manager to contact a realm manager and to request the realm manager to authorize a fail-over event, wherein the realm manager is one of a plurality of realm managers each of which maintains a record representing a storage configuration of a portion of the data storage system, and wherein authorization of the fail-over event allows the backup manager to perform functions of the primary manager; configuring the plurality of realm managers to determine a first inquiry and a second inquiry using a quorum/consensus algorithm, wherein the first inquiry is whether the primary manager is disabled and wherein the second inquiry is whether there is a quorum of the plurality of realm managers that is in agreement that the primary manager is disabled; and configuring the realm manager to authorize the fail-over event when the first and the second inquiries are determined in the affirmative, thereby allowing the backup manager to function as the primary manager.

In the fault-tolerance methodology of the present invention, a hierarchy of network entities is used for fail-over decision making and execution. In the hybrid quorum/consensus and primary-backup fault-tolerance model according to the present invention, a hierarchy of network entities is established in which a group of realm managers first authorizes a failure-handling event through quorum/consensus and a backup manager then executes the decision of the quorum of realm managers. The realm managers are used for two purposes: for making decisions by consensus, and for keeping a small, fully-distributed database of system information. The realm managers, operating by consensus, determine whether (a) the primary manager can indeed be asserted to be down, and (b) whether there is a quorum of realm managers in agreement on this decision. If both are true, a master realm manager instructs the backup manager to proceed to execute the necessary steps to become the primary manager and function as the primary until the original primary manager is brought back into service.

If any of the inquiries (a) or (b) mentioned in the immediately preceding paragraph fails, the master realm manager instructs the requesting backup manager that the fail-over request has been denied. The backup manager then instructs the client of this fact, and the client, in turn, reports an operational failure to the application program.

The fault-tolerance approach of the present invention handles both single unit failures and network partitions in a unified way, without creating a single cluster out of the fault domain. The hybrid fault-tolerance approach according to the present invention provides fault tolerance at all levels in a distributed data storage system without rigidly partitioning the system into fault domains.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings.

DETAILED DESCRIPTION

Reference will now be made in detail to the preferred embodiments of the present invention, examples of which are illustrated in the accompanying drawings. It is to be understood that the figures and descriptions of the present invention included herein illustrate and describe elements that are of particular relevance to the present invention, while eliminating, for purposes of clarity, other elements found in typical data storage systems or networks.

It is worthy to note that any reference in the specification to "one embodiment" or "an embodiment" means that a particular feature, structure or characteristic described in connection with the embodiment is included in at least one embodiment of the invention. The appearances of the phrase "in one embodiment" at various places in the specification do not necessarily all refer to the same embodiment.

Figure 1:
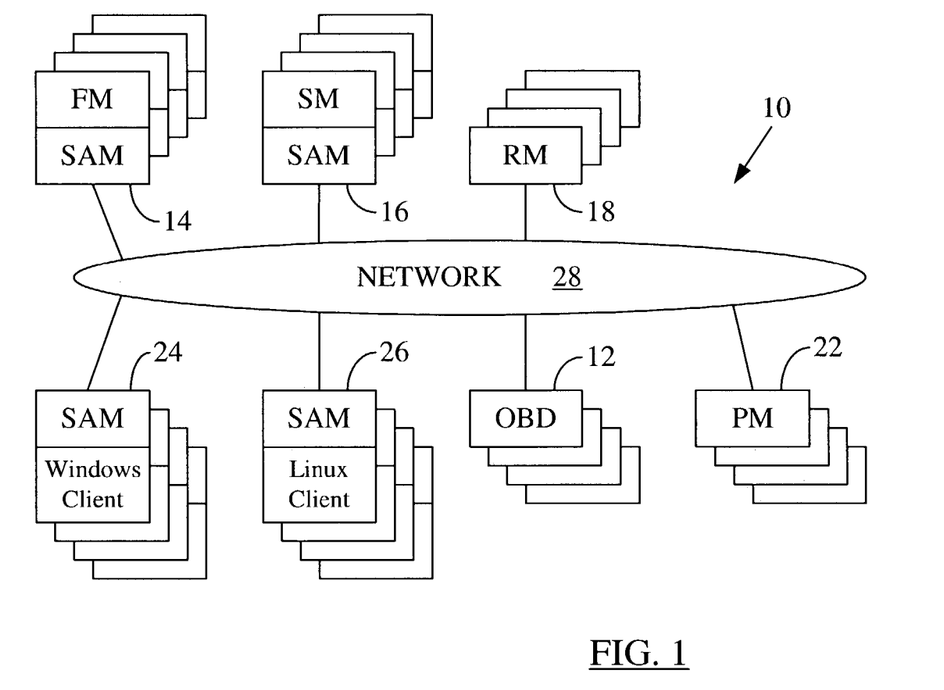
FIG. 1 illustrates an exemplary network-based file storage system designed around Object Based Secure Disks (OBSDs or OBDs)

FIG. 1 illustrates an exemplary network-based file storage system 10 designed around Object Based Secure Disks (OBSDs or OBDs) 12. The file storage system 10 is implemented via a combination of hardware and software units and generally consists of managers 14, 16, 18, and 22, OBDs 12, and clients 24, 26. It is noted that FIG. 1 illustrates multiple clients, OBDs, and managers—i.e., the network entities—operating in the network environment. However, for the ease of discussion, a single reference numeral is used to refer to such entity either individually or collectively depending on the context of reference. For example, the reference numeral "12" is used to refer to just one OBD or a group of OBDs depending on the context of discussion. Similarly, the reference numerals 14–22 for various managers are used interchangeably to also refer to respective servers for those managers. For example, the reference numeral "14" is used to interchangeably refer to the software file managers (FM) and also to their respective servers depending on the context. It is noted that each manager is an application program code or software running on a corresponding server. The server functionality may be implemented with a combination of hardware and operating software. For example, each server in FIG. 1 may be a Windows NT® server. Thus, the file system 10 in FIG. 1 is an object-based distributed data storage system implemented in a client-server configuration.

The network 28 may be a LAN (Local Area Network), WAN (Wide Area Network), MAN (Metropolitan Area Network), SAN (Storage Area Network), wireless LAN, or any other suitable data communication network including a TCP/IP (Transmission Control Protocol/Internet Protocol) based network (e.g., the Internet). A client 24, 26 may be any computer (e.g., a personal computer or a workstation) electrically attached to the network 28 and running appropriate operating system software as well as client application software designed for the system 10. FIG. 1 illustrates a group of clients or client computers 24 running on Microsoft Windows® operating system, whereas another group of clients 26 are running on the Linux® operating system. The clients 24, 26 thus present an operating system-integrated file system interface. The semantics of the host operating system (e.g., Windows®, Linux®, etc.) may preferably be maintained by the file system clients.

The manager (or server) and client portions of the program code may be written in C, C++, or in any other compiled or interpreted language suitably selected. The client and manager software modules may be designed using standard software tools including, for example, compilers, linkers, assemblers, loaders, bug tracking systems, memory debugging systems, etc.

In one embodiment, the manager software and program codes running on the clients may be designed without knowledge of a specific network topology. In that case, the software routines may be executed in any given network environment, imparting software portability and flexibility in storage system designs. However, it is noted that a given network topology may be considered to optimize the performance of the software applications running on it. This may be achieved without necessarily designing the software exclusively tailored to a particular network configuration.

FIG. 1 shows a number of OBDs 12 attached to the network 28. An OBSD or OBD 12 is a physical disk drive that stores data files in the network-based system 10 and may have the following properties: (1) it presents an object-oriented interface rather than a sector-based interface (wherein each "block" on a disk contains a number of data "sectors") as is available with traditional magnetic or optical data storage disks (e.g., a typical computer hard drive); (2) it attaches to a network (e.g., the network 28) rather than to a data bus or a backplane (i.e., the OBDs 12 may be considered as first-class network citizens); and (3) it enforces a security model to prevent unauthorized access to data stored thereon.

The fundamental abstraction exported by an OBD 12 is that of an "object," which may be defined as a variably-sized ordered collection of bits. Contrary to the prior art block-based storage disks, OBDs do not export a sector interface (which guides the storage disk head to read or write a particular sector on the disk) at all during normal operation. Objects on an OBD can be created, removed, written, read, appended to, etc. OBDs do not make any information about particular disk geometry visible, and implement all layout optimizations internally, utilizing lower-level information than can be provided through an OBD's direct interface with the network 28. In one embodiment, each data file and each file directory in the file system 10 are stored using one or more OBD objects.

In a traditional networked storage system, a data storage device, such as a hard disk, is associated with a particular server or a particular server having a particular backup server. Thus, access to the data storage device is available only through the server associated with that data storage device. A client processor desiring access to the data storage device would, therefore, access the associated server through the network and the server would access the data storage device as requested by the client.

On the other hand, in the system 10 illustrated in FIG. 1, each OBD 12 communicates directly with clients 24, 26 on the network 28, possibly through routers and/or bridges. The OBDs, clients, managers, etc., may be considered as "nodes" on the network 28. In system 10, no assumption needs to be made about the network topology (as noted hereinbefore) except that each node should be able to contact every other node in the system. The servers (e.g., servers 14, 16, 18, etc.) in the network 28 merely enable and facilitate data transfers between clients and OBDs, but the servers do not normally implement such transfers.

In one embodiment, the OBDs 12 themselves support a security model that allows for privacy (i.e., assurance that data cannot be eavesdropped while in flight between a client and an OBD), authenticity (i.e., assurance of the identity of the sender of a command), and integrity (i.e., assurance that in-flight data cannot be tampered with). This security model may be capability-based. A manager grants a client the right to access the data storage (in one or more OBDs) by issuing to it a "capability." Thus, a capability is a token that can be granted to a client by a manager and then presented to an OBD to authorize service. Clients may not create their own capabilities (this can be assured by using known cryptographic techniques), but rather receive them from managers and pass them along to the OBDs. In one embodiment, a manager (e.g., a file manager 14) may also contact another manager (e.g., another file manager) for a capability for some specialized operations as discussed later hereinbelow.

A capability is simply a description of allowed operations. A capability may be a set of bits (1's and 0's) placed in a predetermined order. The bit configuration for a capability may specify the operations for which that capability is valid. Thus, there may be a "read capability," a "write capability," etc. Every command sent to an OBD may need to be accompanied by a valid capability of the appropriate type. A manager may produce a capability and then digitally sign it using a cryptographic key that is known to both the manager and the appropriate OBD, but unknown to the client. The client will submit the capability with its command to the OBD, which can then verify the signature using its copy of the key, and thereby confirm that the capability came from an authorized manager (one who knows the key) and that it has not been tampered with in flight. An OBD may itself use cryptographic techniques to confirm the validity of a capability and reject all commands that fail security checks. Thus, capabilities may be cryptographically "sealed" using "keys" known only to one or more of the managers 14–22 and the OBDs 12.

Logically speaking, various system "agents" (i.e., the clients 24, 26, the managers 14–22 and the OBDs 12) are independently-operating network entities. Day-to-day services related to individual files and directories are provided by file managers (FM) 14. The file manager 14 is responsible for all file and directory-specific states. The file manager 14 creates, deletes and sets attributes on entities (i.e., files or directories) on clients' behalf. When clients want to access other entities on the network 28, the file manager performs the semantic portion of the security work—i.e., authenticating the requester and authorizing the access—and issuing capabilities to the clients. File managers 14 may be configured singly (i.e., having a single point of failure) or in fail-over configurations (e.g., machine B tracking machine A's state and if machine A fails, then taking over the administration of machine A's responsibilities until machine A is restored to service). A further discussion of fail-over event handling is given later hereinbelow.

The primary responsibility of a storage manager (SM) 16 is the aggregation of OBDs for performance and fault tolerance. A system administrator (e.g., a human operator or software) may choose any layout or aggregation scheme for a particular object. The SM 16 may also serve capabilities allowing clients to perform their own I/O to aggregate objects (which allows a direct flow of data between an OBD and a client). The storage manager 16 may also determine exactly how each object will be laid out—i.e., on what OBD or OBDs that object will be stored, whether the object will be mirrored, striped, parity-protected, etc. This distinguishes a "virtual object" from a "physical object". One virtual object (e.g., a file or a directory object) may be spanned over, for example, three physical objects (i.e., OBDs).

The installation of the manager and client software to interact with OBDs 12 and perform object-based data storage in the file system 10 may be called a "realm." Thus, the realm includes a set of all network entities (including storage devices) that cooperate to make up one name space. The realm may vary in size, and the managers and client software may be designed to scale to the desired installation size (large or small). A realm manager 18 is responsible for all realm-global states. That is, all states that are global to a realm state are tracked by realm managers 18. A realm manager 18 maintains global parameters, notions of what other managers are operating or have failed, and provides support for up/down state transitions for other managers. Realm managers 18 keep such information as realm-wide file system configuration, and the identity of the file manager 14 responsible for the root of the realm's file namespace. A state kept by a realm manager may be replicated across all realm managers in the system 10, and may be retrieved by querying any one of those realm managers 18 at any time. Updates to such a state may only proceed when all realm managers that are currently functional agree. The replication of a realm manager's state across all realm managers allows making realm infrastructure services arbitrarily fault tolerant—i.e., any service can be replicated across multiple machines to avoid downtime due to machine crashes. In one embodiment, the program codes for various managers shown in FIG. 1 can communicate with one another whenever needed.

The storage access module (SAM) is a program code module that may be compiled into the managers as well as the clients. The SAM generates and sequences the OBD-level operations necessary to implement system-level I/O operations, for both simple and aggregate objects. A performance manager (PM) 22 may run on a server that is separate from the servers for other managers (as shown, for example, in FIG. 1) and may be responsible for monitoring the performance of the file system realm and for tuning the locations of objects in the system to improve performance. The performance manager 22 can be directly manipulated through command-line tools, allowing the system administrator to manually reconfigure the realm.

A further discussion of various managers shown in FIG. 1 (and FIG. 2) and the interaction among them is provided on pages 11–15 in the co-pending, commonly-owned U.S. patent application Ser. No. 10/109,998, filed on Mar. 29, 2002, titled "Data File Migration from a Mirrored RAID to a Non-Mirrored XOR-Based RAID Without Rewriting the Data", whose disclosure at pages 11–15 is incorporated by reference herein in its entirety.

The realm manager 18 identifies which managers in a network contain the location information for any particular data set. The realm manager assigns a primary manager (from the group of other managers in the system 10) which is responsible for identifying all such mapping needs for each data set. Until the realm manager 18 associated with the primary manager informs it differently or, in one embodiment, until the primary manager fails to communicate with its associated realm manager 18, the primary manager continues to function as a primary manager. The realm manager also assigns one or more backup managers (also from the group of other managers in the system) that also track and retain the location information for each corresponding data set. Thus, upon failure of a primary manager, the realm manager 18 may instruct the client 24, 26 to find the location data for a data set through a backup manager. A failure-handling procedure is described hereinbelow with reference to FIG. 4.

Thus, a benefit of the present system is that the location information describing at what data storage device (i.e., an OBD) or devices 12 the desired data is stored may be located at a plurality of processors (i.e., realm managers) in the network. Therefore, a client 24, 26 need only identify one of a plurality of manager processors containing access information for the desired data to be able to access that data. The client can then directly retrieve data from the data storage device without passing data through any manager.

The fact that clients directly access OBDs, rather than going through a server, makes I/O operations in the object-based file system 10 different from other file systems. In one embodiment, prior to accessing any data or metadata, a client must obtain (1) the identity of the OBD on which the data resides and the object number within that OBD, and (2) a capability valid on that OBD allowing the access. Clients learn of the location of objects by directly reading and parsing directory objects located on the OBD(s) identified. Clients obtain capabilities by sending explicit requests to file managers 14. The client includes with each such request its authentication information as provided by the local authentication system. The file manager 14 may perform a number of checks (e.g., whether the client is permitted to access the OBD, whether the client has previously misbehaved or "abused" the system, etc.) prior to granting capabilities. If the checks are successful, the FM 14 may grant requested capabilities to the client, which can then directly access the OBD in question or a portion thereof.

Figure 2:
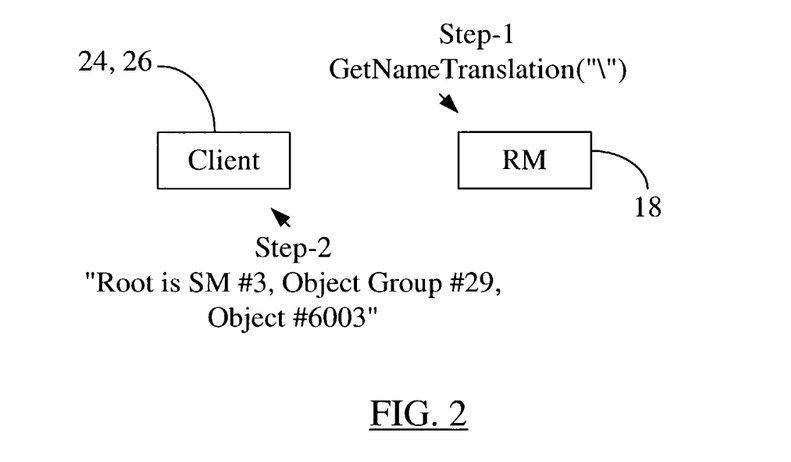
FIG. 2 is a simplified diagram of the process when a client first establishes a contact with the data file storage system in FIG. 1.

FIG. 2 is a simplified diagram of the process when a client 24, 26 first establishes a contact with the data file storage system 10 according to the present invention. At client setup time (i.e., when a client is first connected to the network 28), a utility (or discovery) program may be used to configure the client with the address of at least one realm manager 18 associated with that client. The configuration software or utility program may use default software installation utilities for a given operating system (e.g., the Windows® installers, Linux® RPM files, etc.). A client wishing to access the file storage system 10 for the first time may send a message to its associated realm manager 18 (whose address is provided to the client) requesting the location of the root directory of the client's realm. A "Get Name Translation" command may be used by the client to request and obtain this information as shown by step-1 in FIG. 2. The contacted RM may send the requested root directory information to the client as given under step-2 in FIG. 2. In the example shown in FIG. 2, the root information identifies the triplet {device_ID, object-group_ID, object_ID}, which is {SM #3, object-group #29, object #6003}. Thus, in this example, the storage manager #3 manages the root directory object (#6003) in question. The client may then contact the SM identified in the information received from the RM (as part of that RM's response for the request for root directory information) to obtain necessary capabilities and to begin resolving path names. The client may probably also acquire more information (e.g., the addresses of all realm managers, etc.) before it begins accessing files to/from OBDs.

Figure 3:
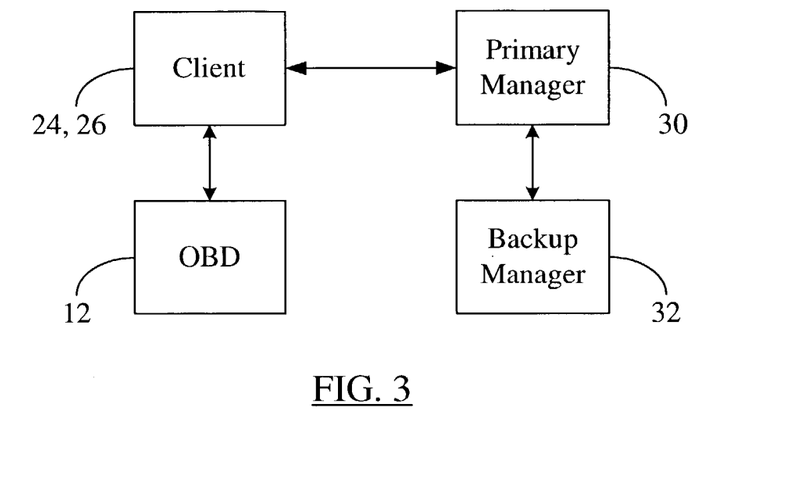
FIG. 3 depicts a simplified diagram showing a client interaction with a primary manager and an OBD during data access.

After the client establishes the initial contact with the file storage system 10—i.e., after the client is "recognized" by the system 10—the client may initiate a data file read/write operation to one or more OBDs 12. FIG. 3 depicts a simplified diagram showing a client interaction with a primary manager 30 and an OBD 12 during data access. The client 24, 26 may initially contact a primary manager 30 to obtain, for example, necessary capabilities or to resolve file path names, and the client may then directly access the appropriate OBD 12 (as discussed before) to access a file object and to perform a data read/write operation on the file object. In the illustration in FIG. 3, the primary manager 30 is shown paired with a backup manager 32. In the embodiment of FIG. 3, there is one backup manager for each primary manager. That is, managers in the system 10 are grouped in pairs. The backup manager, in this case, may be a dedicated machine that does not perform any functions other than just keeping its states up-to-date in case its primary fails. The backup manager's processing power may get wasted in such an arrangement. However, in another embodiment, there may be multiple backup managers for each primary manager. In addition to being a backup manager for a primary manager, each backup manager in this embodiment may itself be a primary manager for some other portion of the network 28. One such multiple-backup-manger configuration is discussed in the co-pending, commonly-owned U.S. patent application Ser. No. 10/324,277, filed on Dec. 19, 2002, titled "Distributing Manager Failure-Induced Workload Through the use of a Manager-Naming Scheme", whose disclosure is incorporated by reference herein in its entirety. In a still further embodiment, there is only one backup manager per primary manager, but a new backup manager is elected at each fail-over event. The fail-over event process is described in more detail hereinbelow.

It is noted that the terms "primary manager" and "backup managers" may include similar managers from any group of managers (e.g., group of file managers 14, group of storage managers 16, etc.) shown in FIG. 1 so long as the backup functionality is implemented for that group of managers. In one embodiment, for example, the primary and backup managers 30, 32 are file managers from the group of file managers 14. In another embodiment, the primary and backup managers are storage managers from the group of storage managers 16. Alternatively, the primary and backup managers may be performance managers 22. In a still further embodiment, a file manager and a storage manager are treated as a pair. Hence, in that embodiment, the primary manager 30 includes one of the file managers 14 and one of the storage managers 16; and the backup manager 32 also includes another one of the file managers 14 and another one of the storage managers 16. In other words, in this embodiment, each file manager is bound together in a pair with a different storage manager, and the paired managers are treated as a single primary or backup manager entity for fault tolerance purpose. The paired file and storage managers may reside on a common hardware platform and in the event of a failure of either of them, the entire hardware platform may be taken out of service and replaced by the backup hardware containing the different, backup pair of file and storage mangers.

In one embodiment, the primary manager 30 continually keeps its transient state replicated at the backup manager 32 to allow the backup manager to perform the functions of the primary manager in the event of primary's failure. The primary manager 30 (e.g., a storage manager) may have a mapping table for each file object it manages, and that mapping table remains replicated at the corresponding backup manager 32. The mapping table for a file object may include such information as the storage scheme for the object (e.g., RAID-1, RAID-5, etc.); the identities of the disk(s) (OBDs) storing the object; in case of an aggregate object, the object identifiers used to identify the component objects on each OBD, etc. Each mapping table may get stored on one or more OBDs 12 in the system 10. The primary manager 30 may immediately communicate any change in the information in a file's mapping table to its backup manager 32 so as to maintain the primary manager's most up-to-date state replicated at the backup 32. The constant, live updating by the primary manager of the backup's state may not be "visible" to other managers or network entities in the system 10.

In one embodiment, all file managers 14 are configured as "stateless" network entities. In other words, none of the file managers 14 internally maintains any permanent record of the file system (such as, for example, the layout maps for file objects). In this embodiment, a file manager first contacts the relevant OBD(s) to obtain the desired file system record prior to carrying out other operations. When such a file manager is a primary manager 30, there may not be any need for a backup manager because there is no critical system information that needs to be replicated. When such a file manager fails, it can be easily replaced with another new file manager. On the other hand, in one embodiment, all storage managers 16 are configured as "state-based" machines. Each storage manager 16 in this embodiment maintains some information about each file object it manages. Thus, such a storage manager internally keeps a large amount of state-based information, which must be replicated at another similar backup storage manager in the event of loss of functionality of the primary storage manager. The replication process (discussed above) allows the primary storage manager to communicate its most recent states directly to its backup manager as part of system-wide fault tolerance.

Figure 4:
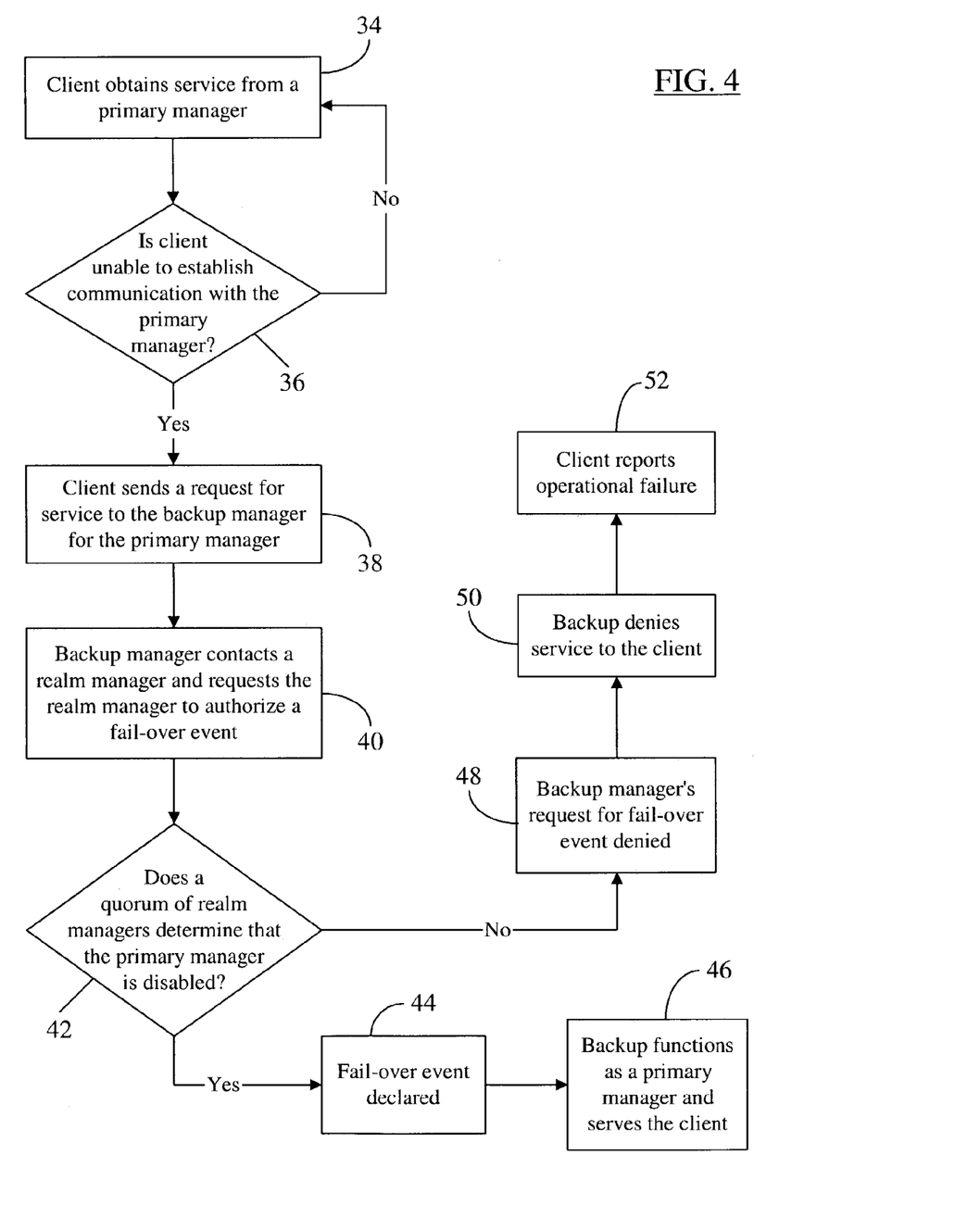
FIG. 4 is an exemplary flowchart of the hybrid quorum/master-backup methodology of the present invention.
Figure 5:
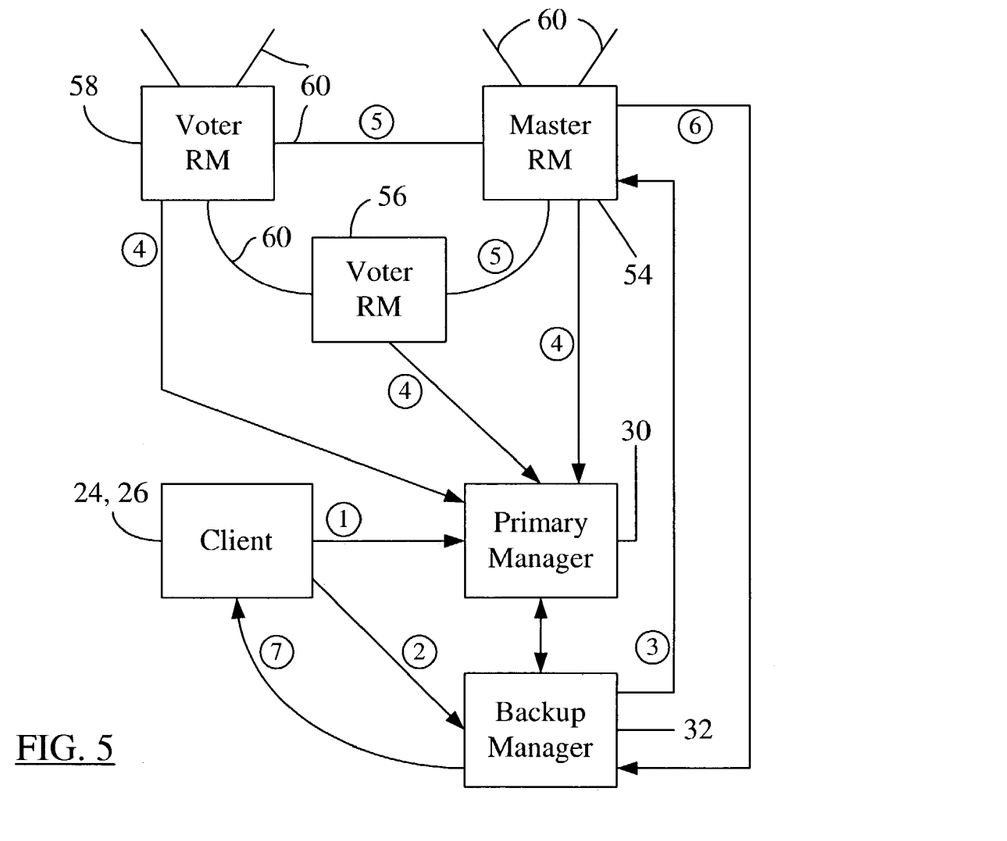
FIG. 5 illustrates an exemplary messaging during a failover decision making by the realm managers in the object-based distributed data storage system of FIG. 1.

FIG. 4 is an exemplary flowchart of the hybrid quorum/master-backup methodology of the present invention. Various stages shown in the flowchart of FIG. 4 are depicted in FIG. 5, which illustrates an exemplary messaging during a fail-over decision making by the realm managers in the object-based distributed data storage system of FIG. 1. In the discussion given below, the flowchart in FIG. 4 and the messaging in FIG. 5 are described in conjunction with each other. Initially, so long as the primary manager 30 is fault-free, the client 24,26 continues to obtain service from the primary manager (blocks 34, 36 in FIG. 4). However, when a client fails to contact or establish a communication with the primary manager 30 for any reason (e.g., primary manager being down or disabled or faulty) (block 36, FIG. 4), the client re-issues its request for service to the primary manager's backup manager 32 (block 38, FIG. 4). This sequence of events is illustrated by message-1 and message-2 in FIG. 5 and is self-explanatory. In one embodiment, in response to the client's request, the backup manager 32 contacts a master realm manager 54 (FIG. 5) and requests the master RM 54 to authorize a fail-over event so that the backup manager can service the client's request (block 40, FIG. 4; message-3, FIG. 5). The scheme of master and voter realm managers is discussed below. In another embodiment, the backup manager 32 may contact the realm manager (in the group of realm managers 18) that is associated with the backup manager to authorize the fail-over event. That realm manager may, in turn, contact the master RM 54 (FIG. 5) to coordinate the events associated with declaration of a fail-over event as discussed below. Alternatively, the realm manager associated with the backup manager may itself coordinate the events associated with a fail-over event. Thus, generally speaking, the realm manager referenced by numeral "54" is just one of the realm managers 18 in the system 10, except that it is configured to coordinate failure-handling activities in consultation with the remaining realm managers in the system.

In the object-based distributed file system 10, there is no single centralized point of control. Therefore, the fail-over event authorization is handled by a "parliament" of controllers (i.e., realm managers 18 as discussed immediately below) to avoid elaborate distributed lock managers (to lock the portions of the system affected by one or more primary managers' failures) or distributed transaction system. The term "fail-over event" may be defined as an assertion made by the realm managers 18, using a quorum/consensus algorithm (described below), that a service requested by a client is no longer available from the primary manager initially contacted by the client. In the present invention, a hierarchy of network entities is established to handle the fail-over event. In other words, in a hybrid fault-tolerance approach, the present invention separates the task of fail-over decision-making from the task of execution of actions needed to effect the fail-over event. The fail-over decision-making is done by a small cluster of managers (i.e., the realm managers 18) using a quorum/consensus technique with a relatively higher communication overload, but with a safer and robust decision-making. However, once the realm managers decide to declare a fail-over event, the quick implementation or execution of their decision is done at the primary manager 30-backup manager 32 level (principally by the backup manager 32 of the failing primary 30). Traditional object-based data storage systems have no such hierarchy or hybrid fault-tolerance model. In those systems, a manager "owns" certain devices and makes the sole decision as to how to handle failures within it, and decisions about fail-over between managers are made solely by that manager and its backup(s).

However, because such system-wide control by a "parliament" of realm managers involves many steps and because the "voting" (discussed below) or communication among realm managers may consume system resources and time, it is desirable to configure realm managers to choose amongst themselves one realm manager (called the master realm manager or master RM 54) that is responsible to coordinate system-wide fail-over event handling in the realm. The master RM 54, thus, is not different from other realm managers 18 in the system; it has just additional duties to coordinate the necessary activities with the consensus from other realm managers. In one embodiment, if such master RM fails, then the entire fail-over event is declared invalid. It is noted that, for the sake of convenience, only two other realm managers 56, 58 (the "voter" realm managers as discussed below) from the group of realm managers 18 are shown in FIG. 5 besides the master RM 54. However, all the realm managers 18 in the system 10 participate in the fail-over decision-making as discussed below. The master and all other realm managers communicate with one another as indicated by their connecting links 60 in FIG. 5. It is further noted that the realm managers shown in FIG. 5 are referred to by numerals 54–58 rather than the common reference numeral 18 for ease of discussion only. The realm managers 54–58 are nothing but three of the realm managers 18 in FIG. 1.

At any time, the realm managers 18 in the system 10 can elect one of them to act as the master RM 54 to manage fail-over event handling. In one embodiment, the master 54 is elected at system boot time. The election of master may be performed using the well-known Distributed Consensus Algorithm (DCA) (also known as Quorum/Consensus Algorithm). A more detailed discussion of DCA is provided in "The Part-Time Parliament" by Leslie Lamport, Digital Equipment Corporation, Sep. 1, 1989, which is incorporated herein by reference in its entirety. The DCA implements a Part Time Parliament (PTP) model in which one node (here, the realm manager acting as the master 54) acts as a president, whereas other nodes (i.e., other realm managers 56, 58, etc.) act as voters/witnesses. The nodes communicate with one another using this PTP model. The president issues "decrees" to voters who, in turn, determine whether the president's action is appropriate-this is known as the "voting phase." The voters then send a message back to the president indicating whether or not they approve the president's action-this is known as the "Success" or "Failure" phase. If each node approves the president's decree, then the president informs all the nodes that the decree has passed.

The elected master RM 54 remains a master until it fails or is taken out of service or the system shuts down. The remaining RMs detect the absence of the master via "heart-beats" (a type of internal messaging in the PTP model), which causes them to perform a quorum/consensus-based election of a new master. Also, if a master RM discovers that it is not in communication with a quorum of realm managers, it abdicates its position and informs other RMs of that action. The RMs may again elect another master using DCA. Thus, at any time, there is at most one master RM in the realm, and there is no master if there is no quorum of realm managers. When there is no quorum of realm managers, the entire realm is either in a failed state, or is transitioning to or from a failed state. For example, in a realm with five realm managers, the no-quorum condition arises when at least three of those managers fail simultaneously. It is noted here that the choice of the method of electing a master RM (e.g., the PTP model or any other suitable method) is independent of the desired system fault tolerance.

Returning now to FIGS. 4 and 5, after the backup manager 32 contacts the master realm manager 54 and requests the master RM 54 to authorize a fail-over event (block 40, FIG. 4; message-3, FIG. 5), the master RM 54 internally communicates with each "voter" RM 56, 58 (and other voter RMs in the group of realm managers 18) to obtain a consensus from the voter RMs that the primary manager 30 has truly failed. In turn, each realm manager (including the master RM 54) individually contacts the primary manager (message-4, FIG. 5) to independently determine whether the primary manager 30 is down. Each voter realm manager communicates its decision on the status of the primary manager 30 to the master RM 54 using their interconnection as indicated by message-5 in FIG. 5. Upon receiving the responses from all the voter realm managers that the primary manager 30 can be asserted to be down, the master RM 54 further determines that there is a quorum of realm managers that is in agreement that the primary manager 30 is down.

Thus, two inquiries are determined by realm managers 18, operating by consensus, as part of authorizing a fail-over event: (1) whether the primary manager can indeed be asserted to be down, and (2) whether there is a quorum of RMs in agreement on this decision. If both of these inquiries are determined in the affirmative (block 42, FIG. 4), each realm manager 18 updates the state of its local copy of manager assignments in the system (which information remains replicated across all realm managers) indicating a change in primary/backup status of the manager pair 30, 32. After successful completion of these operations, the master RM 54 declares that fail-over event has occurred (block 44, FIG. 4) and instructs the backup manager 32 to proceed to execute the necessary steps to become the primary manager (i.e., to take over the functions of the failed primary manager 30) and serve the client's request for service (message-6, FIG. 5). The backup manger 32 may, in turn, commence communication with the client 24, 26 to provide the requested service to the client (message-7, FIG. 5; block 46, FIG. 4).

However, if any of the steps in declaring the fail-over event fails, the master RM 54 may instruct the backup manager 32 (message-6, FIG. 5) that its request for fail-over event has been denied (blocks 42, 48 in FIG. 4). In that case, the backup manager 32 may then instruct the client 24, 26 of this fact and deny the client the service the client had earlier requested (at message-2, FIG. 5) from the backup manager (message-7, FIG. 5; block 50, FIG. 4). Upon receiving a denial of service from the backup manager 32, the client may report (e.g., externally on a display screen as an error message or internally as an entry in an error log) an operational failure, for example, to an application program (running on the client) that requested the service (block 52, FIG. 4).

As compared to file managers 14 or storage managers 16, realm managers 18 are relatively lightly loaded. Therefore, the communication overhead involved in the consensus-based decision making among realm managers 18 in the system 10 remains reasonable. On the other hand, were this consensus-based decision making performed by the master manager 30 and its backup manager 32 themselves, then it would be difficult to implement the fail-over mechanism especially, for example, in the case of a network partition where the master manager 30 and the backup manager 32 reside on different sides of the partition. Similarly, were this consensus-based decision making fully distributed amongst all system managers (i.e., all master managers and their corresponding backups), the overhead to update the states of these managers in the event of a manager's failure would be unacceptable because of generally very large number of managers in the system 10.

As indicated in the "Background" section above, it may not be desirable to partition a distributed data storage system into fault domains. Under the hybrid quorum/master fault-tolerance approach described hereinbefore, there is no need to partition the system 10 into fault domains: a single set of realm managers suffices to authorize fail-over decisions for all primary manager-backup manager pairs in the system 10, regardless of the distribution of workload or responsibility for hardware within the system 10 at the moment of a primary manager's failure.

On the other hand, if one or more network partitions are implemented in the system 10, then these partitions may also be easily handled by the hybrid fault-tolerance model of the present invention. In such a partitioned network, a fail-over event can be authorized only if a quorum of realm managers resides on the same side of the network partition as the backup manager 32 and the client 24, 26. This residence requirement assures that no client is able to update a system state (e.g., by contacting an associated backup manager for service and, thereby, initiating failure-related events in the system) that in a way conflicts with any other client on the other side of a network partition. In such an event, the hybrid quorum/master-based fault-tolerance approach of the present invention makes the explicit decision to deny service to a client rather than allowing these conflicting state updates to occur.

The hybrid (hierarchy-based) fault-tolerance model of the present invention may also be applied to a case where there are multiple backup managers for each primary manager as described, for example, in the previously mentioned commonly-owned, co-pending United States Patent Application titled "Distributing Manager Failure-Induced Workload Through the use of a Manager-Naming Scheme", whose disclosure is incorporated by reference herein in its entirety. In such system configuration, the fault-tolerance model of the present invention may support a cascading fail-over to cover each primary manager-backup manager pair. The hybrid fault-tolerance approach of the present invention may also be applied to a case where there is only one backup manager for each primary manager, but a new backup manager is elected at each fail-over event. In each of these situations, the fail-over events are requested by a backup manager, authorized by the realm managers (operating under quorum/consensus), and implemented by the fail-over requesting backup and/or the newly-elected backup in the same way as described hereinbefore.

It is noted that various managers (e.g., file managers 14, storage managers 16, the realm managers 18, etc.) shown and described with reference to FIG. 1, the program code implemented to operate the system 10 in FIG. 1, and the program code for performing the hybrid fault-tolerance according to an embodiment of the present invention may reside on a computer-readable, tangible storage medium (e.g., a compact disc, an optical disc, a magnetic storage medium such as a computer hard drive ,etc.) allowing ease of software portability and system management. The program code on the storage medium can be executed by a computer system processor and upon execution, the program code may cause the processor to perform various operations described hereinabove with reference to individual components (e.g., managers) constituting the program code. Similarly, a client application (e.g., any of the client applications 24, 26 in FIG. 1) can also be stored on a computer-readable data storage medium and executed therefrom.

The foregoing describes a fault-tolerance methodology in an object-based distributed data storage system wherein a hierarchy of network entities is used for fail-over decision making and execution. In the hybrid quorum/consensus and primary-backup fault-tolerance model according to the present invention, a hierarchy of network entities is established in which a group of realm managers first authorizes a failure-handling event through quorum/consensus and a backup manager then executes the decision of the quorum of realm managers. The realm managers are used for two purposes: for making decisions by consensus, and for keeping a small, fully-distributed database of system information. The realm managers, operating by consensus, determine whether (a) the primary manager can indeed be asserted to be down, and (b) whether there is a quorum of realm managers in agreement on this decision. If both are true, a master realm manager instructs the backup manager to proceed to execute the necessary steps to become the primary manager and function as the primary until the original primary manager is brought back into service. The fault-tolerance approach of the present invention handles both single unit failures and network partitions in a unified way, without creating a single cluster out of the fault domain. The hybrid fault-tolerance approach according to the present invention provides fault tolerance at all levels in a distributed data storage system without rigidly partitioning the system into fault domains.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

The invention claimed is:

1. In an object-based data storage system including a client and a primary manager, a method of handling said client's inability to obtain service from said primary manager, said method comprising:
   configuring said client to issue a request for said service to a backup manager associated with said primary manager;
   configuring said backup manager to contact a realm manager and to request said realm manager to authorize a fail-over event, wherein said realm manager is one of a plurality of realm managers each of which maintains a record representing a storage configuration of a portion of said data storage system, and wherein authorization of said fail-over event allows said backup manager to perform functions of said primary manager;
   configuring said plurality of realm managers to determine a first inquiry and a second inquiry using a quorum/consensus algorithm, and enforcing a result of the first and second inquiries over all of said plurality of realm managers, wherein said first inquiry is whether said primary manager is disabled and wherein said second inquiry is whether there is a quorum of said plurality of realm managers that is in agreement that said primary manager is disabled; and
   configuring said realm manager to authorize said fail-over event when said first and said second inquiries are determined in the affirmative, thereby allowing said backup manager to function as said primary manager;
   further comprising continually updating said backup manager with a full transient state of said primary manager so as to replicate a most recent transient state of said primary manager at said backup manager.

2. The method of claim 1, further comprising configuring said backup manager to process said request for said service and to provide said service to said client.

3. The method of claim 1, wherein configuring said backup manager to contact said realm manager includes configuring said backup manager to contact one of said plurality of realm managers that is associated with said backup manager.

4. In an object-based data storage system including a client and a primary manager, a method of handling said client's inability to obtain service from said primary manager, said method comprising:
   configuring said client to issue a request for said service to a backup manager associated with said primary manager;
   configuring said backup manager to contact a realm manager and to request said realm manager to authorize a fail-over event, wherein said realm manager is one of a plurality of realm managers each of which maintains a record representing a storage configuration of a portion of said data storage system, and wherein authorization of said fail-over event allows said backup manager to perform functions of said primary manager;

configuring said plurality of realm managers to determine a first inquiry and a second inquiry using a quorum/consensus algorithm, and enforcing a result of the first and second inquiries over all of said plurality of realm managers, wherein said first inquiry is whether said primary manager is disabled and wherein said second inquiry is whether there is a quorum of said plurality of realm managers that is in agreement that said primary manager is disabled; and configuring said realm manager to authorize said fail-over event when said first and said second inquiries are determined in the affirmative, thereby allowing said backup manager to function as said primary manager;

further comprising configuring said backup manager to continually maintain thereat a replication of a most recent transient state of said primary manager.

5. In an object-based data storage system including a client and a primary manager, a method of handling said client's inability to obtain service from said primary manager, said method comprising:

configuring said client to issue a request for said service to a backup manager associated with said primary manager;

configuring said backup manager to contact a realm manager and to request said realm manager to authorize a fail-over event, wherein said realm manager is one of a plurality of realm managers each of which maintains a record representing a storage configuration of a portion of said data storage system, and wherein authorization of said fail-over event allows said backup manager to perform functions of said primary manager;

configuring said plurality of realm managers to determine a first inquiry and a second inquiry using a quorum/consensus algorithm, wherein said first inquiry is whether said primary manager is disabled and wherein said second inquiry is whether there is a quorum of said plurality of realm managers that is in agreement that said primary manager is disabled; and configuring said realm manager to authorize said fail-over event when said first and said second inquiries are determined in the affirmative, thereby allowing said backup manager to function as said primary manager;

wherein configuring said backup manager to contact said realm manager includes configuring said backup manager to contact a master realm manager in said plurality of realm managers, wherein said master realm manager is one of said plurality of realm managers and is elected by all realm managers in said plurality of realm managers using said quorum/consensus algorithm.

6. In an object-based data storage system including a client and a primary manager, a method of handling said client's inability to obtain service from said primary manager, said method comprising:

configuring said client to issue a request for said service to a backup manager associated with said primary manager;

configuring said backup manager to contact a realm manager and to request said realm manager to authorize a fail-over event, wherein said realm manager is one of a plurality of realm managers each of which maintains a record representing a storage configuration of a portion of said data storage system, and wherein authorization of said fail-over event allows said backup manager to perform functions of said primary manager;

configuring said plurality of realm managers to determine a first inquiry and a second inquiry using a quorum/consensus algorithm, wherein said first inquiry is whether said primary manager is disabled and wherein said second inquiry is whether there is a quorum of said plurality of realm managers that is in agreement that said primary manager is disabled; and configuring said realm manager to authorize said fail-over event when said first and said second inquiries are determined in the affirmative, thereby allowing said backup manager to function as said primary manager;

said method further comprising partitioning said storage system into a plurality of partitions, wherein each of said plurality of partitions includes a non-overlapping portion of a group of network entities in said storage system, wherein said group of network entities includes said plurality of realm managers, said client, said primary manager and said backup manager.

7. The method of claim 6, wherein configuring said realm manager to authorize said fail-over event includes configuring said realm manager to authorize said fail-over event if all of said quorum of said plurality of realm managers, said client and said backup manager reside on the same side of one of said plurality of partitions.

8. In an object-based data storage system including a client and a primary manager, a method of handling said client's inability to obtain service from said primary manager, said method comprising:

configuring said client to issue a request for said service to a backup manager associated with said primary manager;

configuring said backup manager to contact a realm manager and to request said realm manager to authorize a fail-over event, wherein said realm manager is one of a plurality of realm managers each of which maintains a record representing a storage configuration of a portion of said data storage system, and wherein authorization of said fail-over event allows said backup manager to perform functions of said primary manager;

configuring said plurality of realm managers to determine a first inquiry and a second inquiry using a quorum/consensus algorithm, wherein said first inquiry is whether said primary manager is disabled and wherein said second inquiry is whether there is a quorum of said plurality of realm managers that is in agreement that said primary manager is disabled; and configuring said realm manager to authorize said fail-over event when said first and said second inquiries are determined in the affirmative, thereby allowing said backup manager to function as said primary manager;

wherein configuring said plurality of realm managers to determine said first and said second inquiries includes:

configuring each of said plurality of realm managers except said realm manager authorizing said fail-over event to determine said first inquiry and then to communicate a corresponding decision on said first inquiry to said realm manager; and configuring said realm manager to determine said second inquiry using a decision made by said realm manager on said first inquiry and each said corresponding decision on said first inquiry received from a respective one of a remainder of said plurality of realm managers.

9. In an object-based data storage system including a client and a primary manager, a method of handling said client's inability to obtain service from said primary manager, said method comprising:

configuring said client to issue a request for said service to a backup manager associated with said primary manager;

configuring said backup manager to contact a realm manager and to request said realm manager to authorize a fail-over event, wherein said realm manager is one of a plurality of realm managers each of which maintains a record representing a storage configuration of a portion of said data storage system, and wherein authorization of said fail-over event allows said backup manager to perform functions of said primary manager;

configuring said plurality of realm managers to determine a first inquiry and a second inquiry using a quorum/consensus algorithm, wherein said first inquiry is whether said primary manager is disabled and wherein said second inquiry is whether there is a quorum of said plurality of realm managers that is in agreement that said primary manager is disabled; and configuring said realm manager to authorize said fail-over event when said first and said second inquiries are determined in the affirmative, thereby allowing said backup manager to function as said primary manager;

said method further comprising:

configuring said realm manager to deny authorization of said fail-over event when at least one of said first and said second inquiries is determined in the negative; and configuring said backup manager to deny said client's request for said service when said realm manager denies authorization of said fail-over event.

10. A computer-readable storage medium containing a program code, which, upon execution by a processor in an object-based distributed data storage system, causes said processor to perform the following:

configure a client to issue a request for service to a backup manager associated with a primary manager that has failed to provide said service to said client, wherein said client, said backup manager and said primary manager are part of said data storage system;

configure said backup manager to contact a realm manager and to request said realm manager to authorize a fail-over event, wherein said realm manager is one of a plurality of realm managers in said data storage system, wherein each of said plurality of realm managers maintains a record representing a storage configuration of a portion of said data storage system, and wherein authorization of said fail-over event allows said backup manager to perform functions of said primary manager;

configure said plurality of realm managers to determine a first inquiry and a second inquiry using a quorum/consensus algorithm, and enforce a result of the first and second inquiries over all of said plurality of realm managers, wherein said first inquiry is whether said primary manager is disabled and wherein said second inquiry is whether there is a quorum of said plurality of realm managers that is in agreement that said primary manager is disabled;

configure said realm manager to authorize said fail-over event when said first and said second inquiries are determined in the affirmative, thereby allowing said backup manager to function as said primary manager; and continually update said backup manager with a full transient state of said primary manager so as to replicate a most recent transient state of said primary manager at said backup manager.

11. In an object-based data storage system including a client and a primary manager, a system for handling said client's inability to obtain service from said primary manager, said system comprising:

means for configuring said client to issue a request for said service to a backup manager that is associated with said primary manager in said data storage system;

means for configuring said backup manager to contact a realm manager and to request said realm manager to authorize a fail-over event, wherein said realm manager is one of a plurality of realm managers in said data storage system, wherein each of said plurality of realm managers maintains a record representing a storage configuration of a portion of said data storage system, and wherein authorization of said fail-over event allows said backup manager to perform functions of said primary manager;

means for configuring said plurality of realm managers to determine a first inquiry and a second inquiry using a quorum/consensus algorithm, and enforcing a result of the first and second inquiries over all of said plurality of realm managers, wherein said first inquiry is whether said primary manager is disabled and wherein said second inquiry is whether there is a quorum of said plurality of realm managers that is in agreement that said primary manager is disabled;

means for configuring said realm manager to authorize said fail-over event when said first and said second inquiries are determined in the affirmative, thereby allowing said backup manager to function as said primary manager; and means for continually updating said backup manager with a full transient state of said primary manager so as to replicate a most recent transient state of said primary manager at said backup manager.

12. A computer-readable storage medium containing a program code, which, upon execution by a processor in an object-based distributed data storage system, causes said processor to perform the following:

configure a client to issue a request for service to a backup manager associated with a primary manager that has failed to provide said service to said client, wherein said client, said backup manager and said primary manager are part of said data storage system;

configure said backup manager to contact a realm manager and to request said realm manager to authorize a fail-over event, wherein said realm manager is one of a plurality of realm managers in said data storage system, wherein each of said plurality of realm managers maintains a record representing a storage configuration of a portion of said data storage system, and wherein authorization of said fail-over event allows said backup manager to perform functions of said primary manager;

configure said plurality of realm managers to determine a first inquiry and a second inquiry using a quorum/consensus algorithm, and enforce a result of the first and second inquiries over all of said plurality of realm managers, wherein said first inquiry is whether said primary manager is disabled and wherein said second inquiry is whether there is a quorum of said plurality of realm managers that is in agreement that said primary manager is disabled;

configure said realm manager to authorize said fail-over event when said first and said second inquiries are determined in the affirmative, thereby allowing said backup manager to function as said primary manager; and configure said backup manager to continually maintain thereat a replication of a most recent transient state of said primary manager.

13. In an object-based data storage system including a client and a primary manager, a system for handling said client's inability to obtain service from said primary manager, said system comprising:
  means for configuring said client to issue a request for said service to a backup manager that is associated with said primary manager in said data storage system;
  means for configuring said backup manager to contact a realm manager and to request said realm manager to authorize a fail-over event, wherein said realm manager is one of a plurality of realm managers in said data storage system, wherein each of said plurality of realm managers maintains a record representing a storage configuration of a portion of said data storage system, and wherein authorization of said fail-over event allows said backup manager to perform functions of said primary manager;
  means for configuring said plurality of realm managers to determine a first inquiry and a second inquiry using a quorum/consensus algorithm, and enforcing a result of the first and second inquiries over all of said plurality of realm managers, wherein said first inquiry is whether said primary manager is disabled and wherein said second inquiry is whether there is a quorum of said plurality of realm managers that is in agreement that said primary manager is disabled;
  means for configuring said realm manager to authorize said fail-over event when said first and said second inquiries are determined in the affirmative, thereby allowing said backup manager to function as said primary manager; and
  means for configuring said backup manager to continually maintain thereat a replication of a most recent transient state of said primary manager.

14. In an object-based data storage system including a client and a primary manager, a method of handling said client's inability to obtain service from said primary manager, said method comprising:
  configuring a realm manager to authorize a fail-over event, wherein said realm manager is one of a plurality of realm managers each of which maintains a record representing a storage configuration of a portion of said data storage system, and wherein authorization of said fail-over event allows a backup manager associated with said primary manager to perform functions of said primary manager;
  configuring said plurality of realm managers to determine a first inquiry and a second inquiry using a quorum/consensus algorithm, and enforcing a result of the first and second inquiries over all of said plurality of realm managers, wherein said first inquiry is whether said primary manager is disabled and wherein said second inquiry is whether there is a quorum of said plurality of realm managers that is in agreement that said primary manager is disabled; and
  configuring said realm manager to authorize said fail-over event when said first and said second inquiries are determined in the affirmative, thereby allowing said backup manager to function as said primary manager;
  configuring said client to issue a request for said service to said backup manager;
  further comprising continually updating said backup manager with a full transient state of said primary manager so as to replicate a most recent transient state of said primary manager at said backup manager.

15. In an object-based data storage system including a client and a primary manager, a method of handling said client's inability to obtain service from said primary manager, said method comprising:
  configuring a realm manager to authorize a fail-over event, wherein said realm manager is one of a plurality of realm managers each of which maintains a record representing a storage configuration of a portion of said data storage system, and wherein authorization of said fail-over event allows a backup manager associated with said primary manager to perform functions of said primary manager;
  configuring said plurality of realm managers to determine a first inquiry and a second inquiry using a quorum/consensus algorithm, and enforcing a result of the first and second inquiries over all of said plurality of realm managers, wherein said first inquiry is whether said primary manager is disabled and wherein said second inquiry is whether there is a quorum of said plurality of realm managers that is in agreement that said primary manager is disabled; and
  configuring said realm manager to authorize said fail-over event when said first and said second inquiries are determined in the affirmative, thereby allowing said backup manager to function as said primary manager;
  configuring said client to issue a request for said service to said backup manager;
  further comprising configuring said backup manager to continually maintain thereat a replication of a most recent transient state of said primary manager.

16. In an object-based data storage system including a client and a primary manager, a method of handling said client's inability to obtain service from said primary manager, said method comprising:
  configuring a realm manager to authorize a fail-over event, wherein said realm manager is one of a plurality of realm managers each of which maintains a record representing a storage configuration of a portion of said data storage system, and wherein authorization of said fail-over event allows a backup manager to perform functions of said primary manager;
  configuring said plurality of realm managers to determine a first inquiry and a second inquiry using a quorum/consensus algorithm, wherein said first inquiry is whether said primary manager is disabled and wherein said second inquiry is whether there is a quorum of said plurality of realm managers that is in agreement that said primary manager is disabled; and
  configuring said realm manager to authorize said fail-over event when said first and said second inquiries are determined in the affirmative, thereby allowing said backup manager to function as said primary manager;
  configuring said client to issue a request for said service to said backup manager;
  wherein said system includes a master realm manager in said plurality of realm managers, wherein said master realm manager is one of said plurality of realm managers and is elected by all realm managers in said plurality of realm managers using said quorum/consensus algorithm.

17. In an object-based data storage system including a client and a primary manager, a method of handling said client's inability to obtain service from said primary manager, said method comprising:
  configuring a realm manager to authorize a fail-over event, wherein said realm manager is one of a plurality of realm managers each of which maintains a record representing a storage configuration of said data storage system, and wherein authorization of said fail-over event allows a backup manager to perform functions of said primary manager;

configuring said plurality of realm managers to determine a first inquiry and a second inquiry using a quorum/consensus algorithm, wherein said first inquiry is whether said primary manager is disabled and wherein said second inquiry is whether there is a quorum of said plurality of realm managers that is in agreement that said primary manager is disabled; and configuring said realm manager to authorize said fail-over event when said first and said second inquiries are determined in the affirmative, thereby allowing said backup manager to function as said primary manager;

configuring said client to issue a request for said service to said backup manager;

said method further comprising partitioning said storage system into a plurality of partitions, wherein each of said plurality of partitions includes a non-overlapping portion of a group of network entities in said storage system, wherein said group of network entities includes said plurality of realm managers, said client, said primary manager and said backup manager.

18. In an object-based data storage system including a client and a primary manager, a method of handling said client's inability to obtain service from said primary manager, said method comprising:

configuring a realm manager to authorize a fail-over event, wherein said realm manager is one of a plurality of realm managers each of which maintains a record representing a storage configuration of a portion of said data storage system, and wherein authorization of said fail-over event allows a backup manager to perform functions of said primary manager;

configuring said plurality of realm managers to determine a first inquiry and a second inquiry using a quorum/consensus algorithm, wherein said first inquiry is whether said primary manager is disabled and wherein said second inquiry is whether there is a quorum of said plurality of realm managers that is in agreement that said primary manager is disabled; and configuring said realm manager to authorize said fail-over event when said first and said second inquiries are determined in the affirmative, thereby allowing said backup manager to function as said primary manager;

wherein configuring said plurality of realm managers to determine said first and said second inquiries includes:

configuring each of said plurality of realm managers except said realm manager authorizing said fail-over event to determine said first inquiry and then to communicate a corresponding decision on said first inquiry to said realm manager;

configuring said realm manager to determine said second inquiry using a decision made by said realm manager on said first inquiry and each said corresponding decision on said first inquiry received from a respective one of a remainder of said plurality of realm managers; and configuring said client to issue a request for said service to said backup manager.

19. In an object-based data storage system including a client and a primary manager, a method of handling said client's inability to obtain service from said primary manager, said method comprising:

configuring a realm manager to authorize a fail-over event, wherein said realm manager is one of a plurality of realm managers each of which maintains a record representing a storage configuration of a portion of said data storage system, and wherein authorization of said fail-over event allows a backup manager to perform functions of said primary manager;

configuring said plurality of realm managers to determine a first inquiry and a second inquiry using a quorum/consensus algorithm, wherein said first inquiry is whether said primary manager is disabled and wherein said second inquiry is whether there is a quorum of said plurality of realm managers that is in agreement that said primary manager is disabled; and configuring said realm manager to authorize said fail-over event when said first and said second inquiries are determined in the affirmative, thereby allowing said backup manager to function as said primary manager;

configuring said client to issue a request for said service to said backup manager;

said method further comprising:

configuring said realm manager to deny authorization of said fail-over event when at least one of said first and said second inquiries is determined in the negative; and configuring said backup manager to deny said client's request for said service when said realm manager denies authorization of said fail-over event.

20. A computer-readable storage medium containing a program code, which, upon execution by a processor in an object-based distributed data storage system, causes said processor to perform the following:

configure a realm manager to authorize a fail-over event, wherein said realm manager is one of a plurality of realm managers in a data storage system, wherein each of said plurality of realm managers maintains a record representing a storage configuration of a portion of said data storage system, and wherein authorization of said fail-over event allows a backup manager to perform functions of a primary manager;

configure said plurality of realm managers to determine a first inquiry and a second inquiry using a quorum/consensus algorithm, and enforce a result of the first and second inquiries over all of said plurality of realm managers, wherein said first inquiry is whether said primary manager is disabled and wherein said second inquiry is whether there is a quorum of said plurality of realm managers that is in agreement that said primary manager is disabled;

configure said realm manager to authorize said fail-over event when said first and said second inquiries are determined in the affirmative, thereby allowing said backup manager to function as said primary manager;

configure a client to issue a request for service to said backup manager; and continually update said backup manager with a full transient state of said primary manager so as to replicate a most recent transient state of said primary manager at said backup manager.

21. A computer-readable storage medium containing a program code, which, upon execution by a processor in an object-based distributed data storage system, causes said processor to perform the following:

configure a realm manager to authorize a fail-over event, wherein said realm manager is one of a plurality of realm managers in a data storage system, wherein each of said plurality of realm managers maintains a record representing a storage configuration of a portion of said data storage system, and wherein authorization of said fail-over event allows a backup manager to perform functions of a primary manager;

configure said plurality of realm managers to determine a first inquiry and a second inquiry using a quorum/ consensus algorithm, and enforce a result of the first and second inquiries over all of said plurality of realm managers, wherein said first inquiry is whether said primary manager is disabled and wherein said second inquiry is whether there is a quorum of said plurality of realm managers that is in agreement that said primary manager is disabled;

configure said realm manager to authorize said fail-over event when said first and said second inquiries are determined in the affirmative, thereby allowing said backup manager to function as said primary manager;

configure a client to issue a request for service to said backup manager; and configure said backup manager to continually maintain thereat a replication of a most recent transient state of said primary manager.

22. In an object-based data storage system including a client and a primary manager, a system for handling said client's inability to obtain service from said primary manager, said system comprising:

means for configuring a realm manager to authorize a fail-over event, wherein said realm manager is one of a plurality of realm managers in said data storage system, wherein each of said plurality of realm managers maintains a record representing a storage configuration of a portion of said data storage system, and wherein authorization of said fail-over event allows a backup manager to perform functions of said primary manager;

means for configuring said plurality of realm managers to determine a first inquiry and a second inquiry using a quorum/consensus algorithm, and enforcing a result of the first and second inquiries over all of said plurality of realm managers, wherein said first inquiry is whether said primary manager is disabled and wherein said second inquiry is whether there is a quorum of said plurality of realm managers that is in agreement that said primary manager is disabled;

means for configuring said realm manager to authorize said fail-over event when said first and said second inquiries are determined in the affirmative, thereby allowing said backup manager to function as said primary manager;

means for configuring said client to issue a request for said service to said backup manager; and means for continually updating said backup manager with a full transient state of said primary manager so as to replicate a most recent transient state of said primary manager at said backup manager.

23. In an object-based data storage system including a client and a primary manager, a system for handling said client's inability to obtain service from said primary manager, said system comprising:

means for configuring a realm manager to authorize a fail-over event, wherein said realm manager is one of a plurality of realm managers in said data storage system, wherein each of said plurality of realm managers maintains a record representing a storage configuration of a portion of said data storage system, and wherein authorization of said fail-over event allows a backup manager to perform functions of said primary manager;

means for configuring said plurality of realm managers to determine a first inquiry and a second inquiry using a quorum/consensus algorithm, and enforcing a result of the first and second inquiries over all of said plurality of realm managers, wherein said first inquiry is whether said primary manager is disabled and wherein said second inquiry is whether there is a quorum of said plurality of realm managers that is in agreement that said primary manager is disabled;

means for configuring said realm manager to authorize said fail-over event when said first and said second inquiries are determined in the affirmative, thereby allowing said backup manager to function as said primary manager;

means for configuring said client to issue a request for said service to said backup manager; and means for configuring said backup manager to continually maintain thereat a replication of a most recent transient state of said primary manager.

* * * * *